United States Patent [19]
Reinhardt et al.

[11] 3,867,197
[45] Feb. 18, 1975

[54] PROCESS FOR THE RELEASING OF MATERIALS FROM VOLUMINOUS PRECIPITATES OR SUSPENSIONS

[75] Inventors: Helmut Reinhardt, Rodenkirchen; Karl Trebinger; Gottfried Kallrath, both of Wesseling, all of Germany

[73] Assignee: Deutsche Gold- und Silber-Scheideanstalt vormals Roessler, Frankfurt/Main, Germany

[22] Filed: Mar. 20, 1973

[21] Appl. No.: 343,170

[30] Foreign Application Priority Data
Mar. 27, 1972 Germany............................ 2214826

[52] U.S. Cl. ............. 134/25 R, 23/270 R, 423/367, 134/34, 423/150, 423/325, 423/335, 423/131, 423/109, 423/155
[51] Int. Cl..... B01d 12/00, C01b 33/18, C01c 3/12
[58] Field of Search........ 23/270 R, 285; 423/658.5, 423/367, 150, 335, 325, 131, 109, 155; 210/21; 134/34, 25 R

[56] References Cited
UNITED STATES PATENTS

| | | | |
|---|---|---|---|
| 2,005,698 | 6/1935 | Grove | 423/367 |
| 2,749,290 | 6/1956 | Penick | 134/34 |
| 2,758,070 | 8/1956 | Yurko | 134/25 R |
| 2,783,884 | 3/1957 | Schaub | 134/25 R |
| 2,801,966 | 8/1957 | Martes | 134/25 R |
| 2,951,036 | 8/1960 | Bodkin | 134/25 R |
| 3,021,191 | 2/1962 | Rhodes | 423/367 |
| 3,155,697 | 11/1964 | Jurgen-Lohmann | 23/270 R |
| 3,200,067 | 8/1965 | Levendusky | 23/270 R |
| 3,295,932 | 1/1967 | Boutin | 23/270 R |
| 3,343,919 | 9/1967 | Miller | 23/270 R |
| 3,390,402 | 6/1968 | Goerg | 23/270 R |
| 3,432,429 | 3/1969 | Mihara | 23/270 R |
| 3,468,633 | 9/1969 | Honchar | 23/270 R |
| 3,695,849 | 10/1972 | Rodriquez | 23/270 R |

FOREIGN PATENTS OR APPLICATIONS
889,673  2/1962  Great Britain............... 423/367

Primary Examiner—Norman Yudkoff
Assistant Examiner—S. J. Emery
Attorney, Agent, or Firm—Cushman, Darby & Cushman

[57] ABSTRACT

Voluminous precipitates or suspensions are contacted countercurrently with liquid purification or extraction agents that hold the continuously supplied precipitate or suspension in the upwardly flowing liquid in a kind of fluidized bed. A suitable apparatus is also described.

8 Claims, 1 Drawing Figure

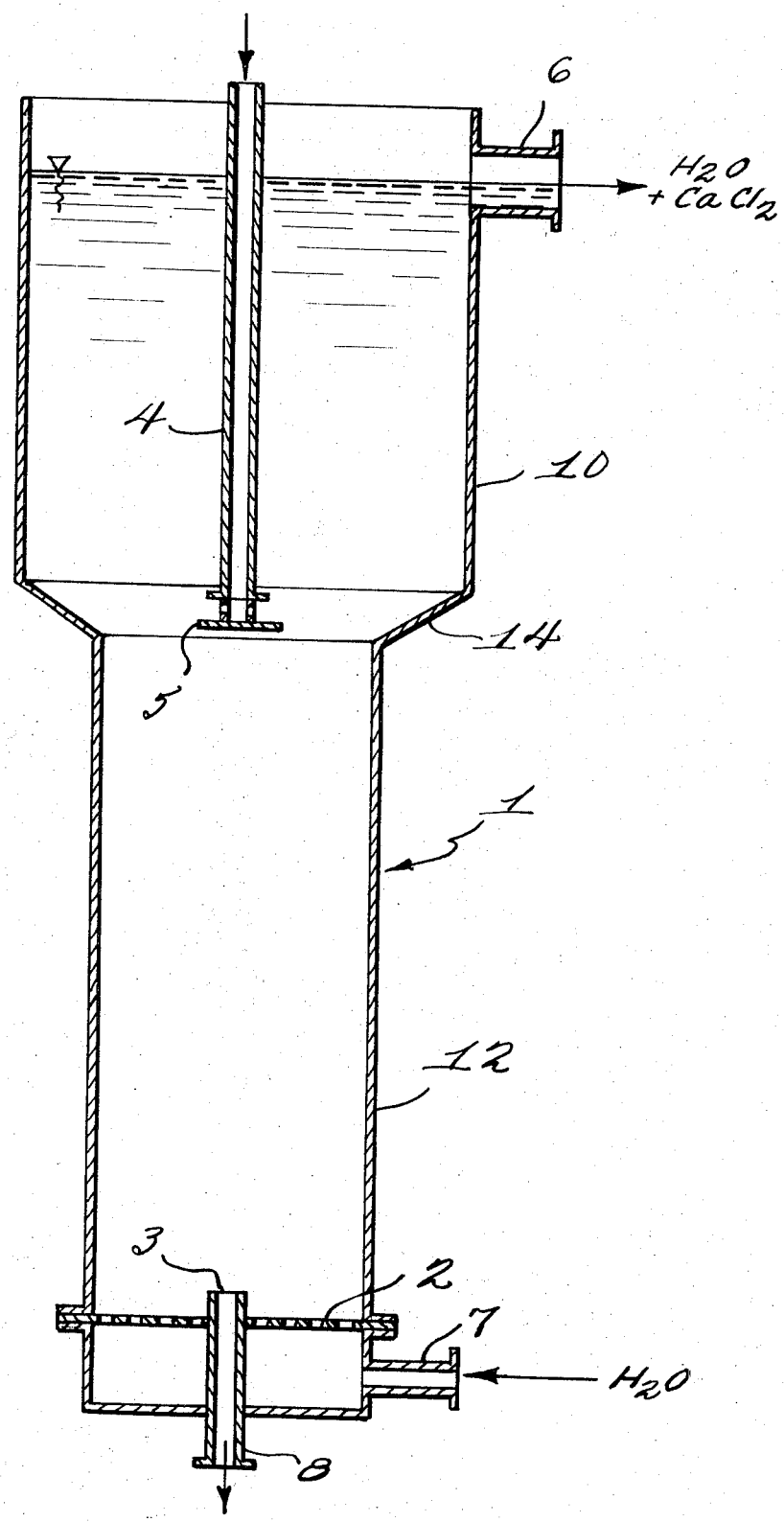

PROCESS FOR THE RELEASING OF MATERIALS FROM VOLUMINOUS PRECIPITATES OR SUSPENSIONS

It is known that voluminous precipitates such as, for example, hydroxides, are only freed with great difficulty from adhering soluble constituents. The working up of such products is carried out for the most part by frequent decanting and pressing off the precipitate in a filter press. It is possible to wash in a filter press. However this is mostly very time-consuming because of the poor filtration behavior of such precipitates. Also these processes, which are always run off discontinuously, are bound to be a considerable expense in personnel. There are needed large tanks which require much space. The preparation of the waste water often causes difficulties since the waste water accumulation takes place in batches in the decanting. This requires an oversizing of the clarifying apparatus or the waste drains off in poorly clarified condition. Precipitates of the above described types, for example, are the hydroxides of iron, zinc, aluminum, titanium, beryllium, chromium, as well as silica, silicates and other finely divided materials which are used as pigments.

In contrast it has now been found that voluminous precipitates or suspensions can be easily freed of the adhering dissolved materials if they are brought into countercurrent contact with liquid purifications or extraction agents, that the constantly fed precipitate or suspension is held by the upwardly flowing liquid in a suspended condition in the manner of a fluidized bed, whereupon the dissolved material is withdrawn with the liquid agent over the top of the column and the precipitate or paste freed from adhering material is withdrawn from the bottom of the column as a suspension and is separately concentrated in known manner.

As washing agent there is preferably added water. However, there can also be used aqueous solutions of organic solvents if they satisfactorily dissolve the impurities. Thus there can be used lower molecular weight aliphatic alcohols and ketones such as methyl alcohol, ethyl alcohol, isopropyl alcohol, propyl alcohol, butyl alcohol, acetone and methyl ethyl ketone as well as ammonia, aliphatic amines, e.g. methyl amine, ethyl amine, propyl amine, diethylamine, ethyl propyl amine, trimethyl amine, aliphatic aminoalcohols, e.g. ethanolamine, diethanolamine, triethanolamine, propanolamine and low molecular weight aliphatic acids, e.g. formic acid, acetic acid, propionic acid and butyric acid. In general heterophilic organic compounds can be added.

Generally the process is carried out so that the liquid purification agent enters from below into the washing apparatus and the suspension to be washed arrives through a dip tube in the upper part of the apparatus.

The speeding of falling of the solid material must be greater than the upward flowing speed of the washing liquid, which amounts to a maximum of 90% of the dropping speed.

The process of the invention can be carried out in all apparatuses known for fluidized bed processes. The preferred apparatus, however, is a special apparatus of the invention described below.

The invention will be understood best in connection with the drawings wherein the single FIGURE is a schematic representation of a preferred apparatus.

Referring more specifically to the drawings, there is provided a cylindrical column 1 having a widened upper portion, preferably in the upper third, to form a tubular portion 10. The ratio of the cross section of the upper tubular portion 10 to the lower tubular portion 12 is preferably 1:2. The upper section 10 and the lower section 12 are joined by a short frustoconical section 14. Greater particle dispersion, however, can require a greater ratio or a smaller particle dispersion makes possible a smaller ratio of the cross sections. The increase in the cross section serves to lower the velocity of upward flow. The screen 2 effects an equal distribution of the washing liquid which enters via line 7. The distribution, however, can also take place with the help of a bubble plate or a tuyere plate. In the drain 3 there is located a measuring instrument, for example, an apparatus for measuring the electrical conductivity, with which the washing process can be controlled. The dip tube 4, for introduction of the precipitated or suspended product, is provided with spray diffuser apparatus 5, for example, a plate which provides for a uniform distribution of the suspension over the entire cross section of the lower part of the washing apparatus.

Through the product discharge 8 a diluted suspension is discharged which can be concentrated in known manner by decanting or centrifuging. In special cases, however, the solid material can be recovered as a dry powder (spray drying). It is also possible to subject the solid material in the form of the suspension to a subsequent reaction.

The process and apparatus are especially suited for washing so-called Berlin white and Berlin blue (Prussian blue) as well as other voluminous metal salts of ferro or ferricyanic acid, as well as for silicic acid and silicates, e.g. aluminum silicate, zinc silicate, calcium silicate and magnesium silicate.

Unless otherwise indicated all parts and percentages are by weight.

EXAMPLE 1

A washing apparatus according to the FIGURE and made of glass consisted of a tubular column having a lower portion 24 cm. long and 9 cm. in diameter and an upper portion 16 cm. long and 14 cm. in diameter. The two portions were connected by a frustoconical section. The bottom consisted of a glass frit GO ($\phi$ $\Lambda$50–200$\mu$m) through which the wash water was introduced. A few millimeters above the bottom there was located a drain for the washed suspension. The draining suspension was inspected for its contents of soluble material by means of an electrode which measured the electrical conductivity. The suspension to be washed was introduced through a dip tube which terminated in the frustoconical portion of the apparatus. A deflection plate was provided below the tube to uniformly distribute the solid material. The wash water discharged from a side pipe 6 in the upper wide portion of the apparatus.

An aqueous suspension of the so-called Berlin white, an iron(II) salt of ferrocyanic acid still contained dissolved calcium chloride from the production from calcium ferrocyanide and iron (II) chloride. The calcium chloride was to be removed. The finely divided precipitate was flocculated by addition of a non-ionic flocculating agent, specifically polyacrylamide, in order to increase the speed of sinking. The suspension was introduced through the dip tube into the wash water flowing upwardly from below. The Berlin white particles slowly sank against the counter flowing water and were discharged from the bottom pipe. Inside 1 hour 5.5 liters of a suspension having 70 grams/liter of Berlin white were passed through. The wash water needed amounted to 23 liters. The electrical conductivity of the draining suspension was at 2050μS compared to 1780μS of the wash water.

EXAMPLE 2

A semi-industrial apparatus of glass was built according to the principles given in example 1. The measurements were as follows:

lower portion diameter 200 mm., length 1300 mm.
upper portion diameter 400 mm., length 400 mm.

The material washed was silica which was produced by precipitation from water glass and sulfuric acid. Within 1 hour 170 liters of a suspension having a solids contents of 29 grams/liter, were freed of the soluble constituents ($Na_2SO_4$). 340 liters of wash water were used for that purpose. The conductivity of the draining suspension amounted to 2000μS in comparison to 1500μS in the wash water added.

What we claim is:

1. A process for removing water soluble material from a voluminous suspension of solid material in water in an apparatus comprising a vertical column, said column having an upper widened portion, a lower narrow portion, and a frustoconical portion connecting said upper and lower portions, the cross-section of the upper portion being approximately twice that of the lower portion, first conduit means for introducing said suspension extending from above through said upper portion and terminating near the bottom of the frustoconical portion, second conduit means near the bottom of the column for introduction of wash water, substantially horizontal distributing means in the bottom of the column above the second conduit means, first discharge conduit means at the bottom of said column for discharging purified suspension, said first discharge conduit means extending from slightly above the distributing means through said distributing means to a point below the introduction of the wash water, and second discharge exit in the upper portion of the column for removing wash water containing solubles released from the voluminous suspension, said upper discharge exit being at a point above the introduction of the suspension into the column, said process comprising introducing said suspension through said first conduit means, introducing wash water through said second conduit means, continuously passing the suspension downwardly through said column in countercurrent flow to upwardly flowing wash water and thereby transferring the water soluble material to the upwardly flowing wash water, the velocity of upward flow being lower in the upper widened portion of the column than in the lower narrowed portion, separating the thus purified suspension from the wash water, discharging the purified suspension from the bottom of the column downwardly through said first discharge conduit means and discharging the wash water containing solubles released from the voluminous suspension through said second discharge exit.

2. A process according to claim 1 comprising concentrating the separated suspension by eliminating water therefrom.

3. A process according to claim 1 wherein the suspension is introduced into the wash water at a point approximately one-third of the total distance between the exit of the wash water containing the soluble material and the entrance of the wash water.

4. A process according to claim 3 wherein the suspension is thoroughly dispersed into the wash water at the time of its introduction thereto.

5. A process according to claim 4 wherein the column has approximately twice the diameter above the entrance of the suspension as it has below said entrance.

6. A process according to claim 1 wherein the suspension is a suspension of ferro-hexacyanoferrate (II).

7. A process according to claim 1 wherein the suspension is a suspension of silica.

8. A process according to claim 1 wherein the suspension is a suspension of Berlin blue.

* * * * *